United States Patent
Huang

(10) Patent No.: US 11,486,765 B2
(45) Date of Patent: Nov. 1, 2022

(54) METHOD FOR DETECTING VARIATION VALUE

(71) Applicant: HKC Corporation Limited, Guangdong (CN)

(72) Inventor: Beizhou Huang, Guangdong (CN)

(73) Assignee: HKC Corporation Limited, Shenzhen (CN)

(\*) Notice: Subject to any disclaimer, the term of this patent is extended or adjusted under 35 U.S.C. 154(b) by 577 days.

(21) Appl. No.: 16/253,193

(22) Filed: Jan. 21, 2019

(65) Prior Publication Data
US 2020/0011736 A1    Jan. 9, 2020

Related U.S. Application Data

(63) Continuation of application No. PCT/CN2018/115113, filed on Nov. 13, 2018.

(30) Foreign Application Priority Data

Jul. 4, 2018 (CN) .......................... 201810724408.1

(51) Int. Cl.
*G01J 3/50* (2006.01)
*G01J 1/44* (2006.01)
*G02F 1/13* (2006.01)
*G01J 1/42* (2006.01)

(52) U.S. Cl.
CPC ............... *G01J 3/506* (2013.01); *G01J 1/44* (2013.01); *G02F 1/1309* (2013.01); *G01J 2001/4247* (2013.01)

(58) Field of Classification Search
CPC ...... G01J 3/506; G01J 3/50; G01J 1/44; G01J 2001/4247; G01J 1/42; G02F 1/1309; G02F 1/1306; G02F 1/13; G05B 19/418; G06Q 10/06; G01M 11/00; G01M 11/02
See application file for complete search history.

(56) References Cited

U.S. PATENT DOCUMENTS

| | | | | |
|---|---|---|---|---|
| 8,620,634 | B2* | 12/2013 | Foslien Graber | G06Q 10/06 703/5 |
| 11,016,467 | B2* | 5/2021 | Lee | G05B 19/418 |
| 2018/0060752 | A1 | 3/2018 | Gross et al. | |
| 2019/0196445 | A1* | 6/2019 | Lee | G05B 19/4015 |
| 2020/0011736 | A1* | 1/2020 | Huang | G01J 1/44 |
| 2021/0104423 | A1* | 4/2021 | Beatty | G06Q 10/06 |

FOREIGN PATENT DOCUMENTS

| | | |
|---|---|---|
| CN | 1553172 A | 12/2004 |
| CN | 103902437 A | 7/2014 |
| CN | 104503402 A | 4/2015 |

(Continued)

OTHER PUBLICATIONS

1st Office Action of counterpart Chinese Patent Application No. 201810724408.1 dated Dec. 3, 2019.

*Primary Examiner* — John R Lee

(57) ABSTRACT

Embodiments of the present disclosure provides a method for detecting variation value comprising selecting a numerical value in a first time interval as a comparison basis; selecting a numerical value in a second time interval as a inspection interval; statistically identifying the numerical value of the inspection interval and the numerical value of the comparison basis are to detect a variation value.

14 Claims, 1 Drawing Sheet

```
┌─────────────────────────────────────────────────┐
│ selecting a numerical value in a first time     │
│ interval as a comparison basis                  │──── S110
└─────────────────────────────────────────────────┘
                        │
                        ▼
┌─────────────────────────────────────────────────┐
│ selecting a numerical value in a second time    │
│ interval as a inspection interval               │──── S120
└─────────────────────────────────────────────────┘
                        │
                        ▼
┌─────────────────────────────────────────────────┐
│ statistically identifying the numerical value   │
│ of the inspection interval and the numerical    │
│ value of the comparison reference to            │──── S130
│ detect a variation value                        │
└─────────────────────────────────────────────────┘
```

(56) References Cited

FOREIGN PATENT DOCUMENTS

| | | | |
|---|---|---|---|
| CN | 106840322 | A | 6/2017 |
| CN | 106970577 | A | 7/2017 |
| CN | 107202604 | A | 9/2017 |
| CN | 107515118 | A | 12/2017 |
| CN | 107977301 | A | 5/2018 |
| TW | I266249 | B | 11/2006 |

\* cited by examiner

METHOD FOR DETECTING VARIATION VALUE

CROSS REFERENCE TO RELATED APPLICATIONS

The present application is a Continuation Application of PCT Application No. PCT/CN2018/115113 filed on Nov. 13, 2018, which claims the benefit of Chinese Patent Application No. 201810724408.1 filed on Jul. 4, 2018, the contents of which are incorporated herein by reference in their entirety.

FIELD OF THE DISCLOSURE

Embodiments of the present disclosure relate to signal detection and processing techniques, in particular, to a method for detecting a variation value.

BACKGROUND OF THE DISCLOSURE

In the processing of modern products, a variety of quality inspection links are required to ensure the quality of the products and enhance the competitiveness of the products. For the detection of the display panel, it is necessary to detect the appearance size and the optical characteristics of the display panel, for example, the optical performance such as brightness and chromaticity of the display panel to ensure the quality of the finished product.

The general staff will manually determine if there is a variance value in order to study the source of the variation to monitor, control and improve the process. However, the manual judgment has problems of judgment error and low production efficiency, so this problem requires to be solved urgently.

SUMMARY OF THE DISCLOSURE

Embodiments of the present disclosure provide a method for detecting a variation value to realize automatic detection and automatic judgment of a variation value, and improve production efficiency.

Embodiments of the present disclosure provide a method for detecting variation value comprising:

selecting a numerical value in a first time interval as a comparison basis;

selecting a numerical value in a second time interval as a inspection interval; and statistically identifying the numerical value of the inspection interval and the numerical value of the comparison basis are to detect a variation value.

In the method for detecting a variation value provided by embodiments of the present disclosure, the comparison and inspection intervals are selected, and the numerical value in the inspection interval is compared with the numerical value in the comparison basis to detect whether there is a variation value. The process of the whole method is automatically carried out, and the automatic detection and automatic judgment of the variation value are realized compared with the manual judgment, and the production efficiency is improved.

DETAILED DESCRIPTION OF THE EMBODIMENTS

Figure 1:
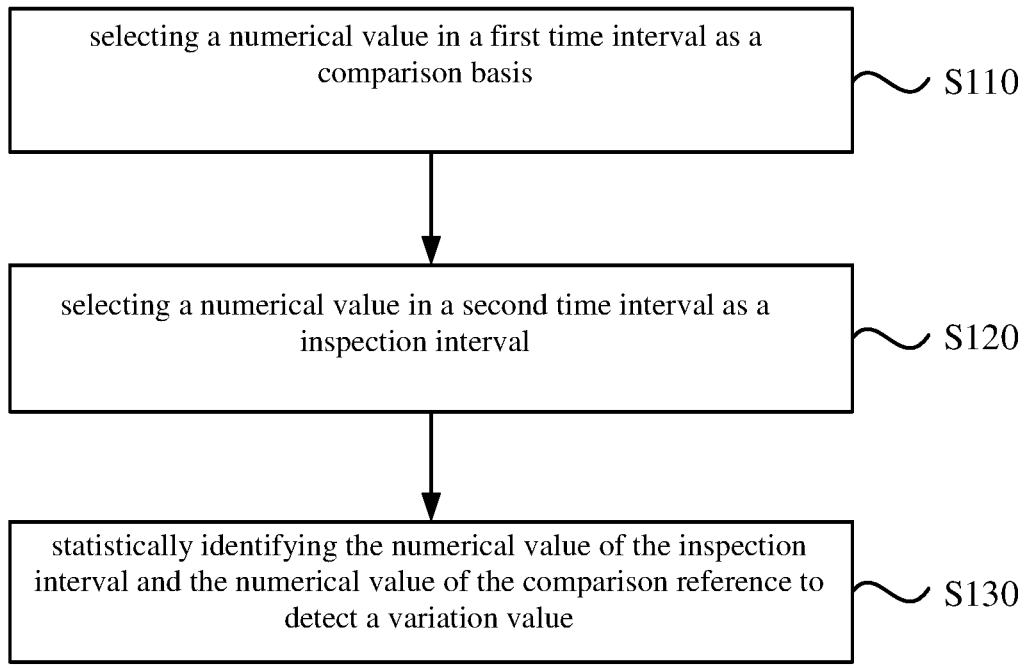
FIG. 1 is a flow chart of a method for detecting a variation value according to an embodiment of the present disclosure.

The present disclosure will be further described in detail in combination with drawings and the embodiment. It is to be understood that the specific embodiments described herein are merely illustrative of the present disclosure and are not intended to be limiting. In addition, it should be noted that, for the convenience of description, only some but not all of the structures related to the present disclosure are shown in the drawings.

Figure 2:
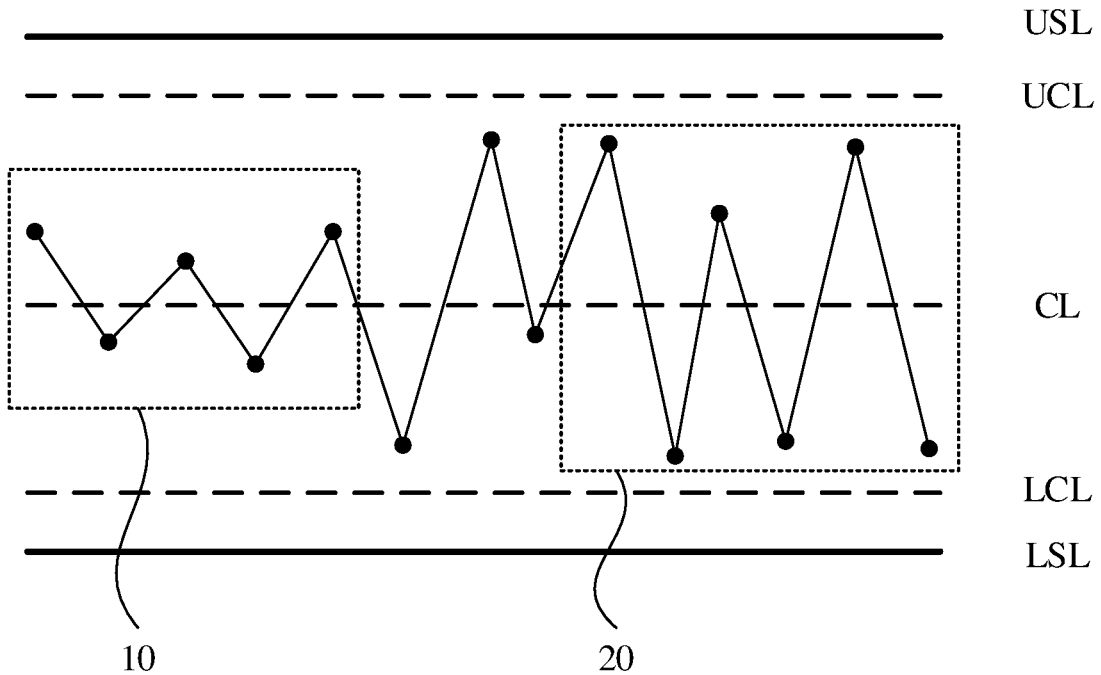
FIG. 2 is a view of an SPC control according to an embodiment of the present disclosure.

The present disclosure uses an SPC system to control the quality of a display panel. The SPC system, also known as statistical process control, is a process control tool that utilizes mathematical statistics methods. It analyzes and evaluates the production process, timely identify signs of systemic factors according to the feedback information, and takes measures to eliminate its effects, so that the process is maintained in a controlled state that is only affected by random factors to achieve the purpose of quality control. FIG. 1 is a flow chart of a method for detecting a variation value according to an embodiment of the present disclosure; FIG. 2 is a view of an SPC control according to an embodiment of the present disclosure. Referring to FIGS. 1 and 2, the SPC control chart is a record graphic with control limits that reflects the quality of the process, wherein the vertical axis of the SPC control chart represents the product quality characteristic value (or some statistic amount obtained from the quality characteristic value), and the horizontal axis represents the individual sample numbers extracted in chronological order (from left to right). The numerical value points in FIG. 2 represent monitored data, which may be, for example, product information such as brightness or chromaticity of each liquid crystal display panel collected. USL is the upper limit of the specification, LSL is the lower limit of the specification, and the upper limit of the specification and the lower limit of the specification are collectively referred to as the specification limit. The specification limit is the maximum (small) permissible value for specifying the quality characteristics, and the specification limits are defined by the engineer in advance. UCL is the upper control limit, and LCL is the lower control limit. The control limit is calculated by extracting a certain number of products from the actual produced products, testing and then observing from the observations. For example, the upper control limit UCL may be set to an average value+4*standard deviation, and the average value and the standard deviation may be calculated based on part or all of the historical data. CL is the center line. In general, the upper control limit UCL and the lower control limit LCL are symmetric about the center line CL. The detection method may be applied to an SPC system for monitoring, controlling, and improving various processes of the display panel. The detection method may be implemented by software and/or hardware, and the detection method comprises steps of:

S110, selecting a numerical value in a first time interval as a comparison basis.

The first time interval refers to a time period. For example, the monitored data of the last year (the monitored data is the numerical value) is selected as the comparison basis 10, or the monitored data of the previous month is selected as the comparison basis 10. Thus, the comparison basis 10 is a particular set, and the comparison basis 10 includes the detected data collected during the first time interval. In general, the monitored data of the comparison basis 10 as a whole is a numerical value in a state in which the product is produced in a good state.

S120, selecting a numerical value in a second time interval as a inspection interval.

The second time interval is also a time period, but the first time interval does not overly with the second time interval, and there is no inclusion relationship, that is, the first time interval does not include the second time interval, and the second time interval does not include the first time interval. More preferably, the first time interval and the second time interval do not overlap, for example, the first time interval is 2017.01.01-2017.02.01, and the second time interval is 2017.03.01-2017.04.01. For example, the monitored data from the 1st to the 10th of this month is selected as the inspection interval 20, and the numerical value in the inspection interval 20 is the object to be detected.

S130, statistically identifying the numerical value of the inspection interval and the numerical value of the comparison basis to detect a variation value.

Statistically identifying the numerical value of the inspection interval 20 and the numerical value of the comparison basis 10, i.e., the statistical identification is to compare the numerical value of the inspection interval 20 with the value of the comparison basis 10 by using a statistical method to detect whether the numerical value of the inspection interval 20 has a variation value, may further count the number of the variation value and the degree of variation of the variation value.

In the method for detecting a variation value provided by embodiments of the present disclosure, the comparison and inspection intervals are selected, and the numerical value in the inspection interval is compared with the numerical value in the comparison basis to detect whether there is a variation value. The process of the whole method is automatically carried out, and the automatic detection and automatic judgment of the variation value are realized compared with the manual judgment, and the production efficiency is improved.

Optionally, when the numerical value of the inspection interval 20 and the numerical value of the comparison basis 10 are statistically identified, the nonparametric statistics is employed.

TABLE 1

Comparison table for characteristics of nonparametric
statistics and parametric statistics

| Comparison terms | Nonparametric statistics | Parametric statistics |
|---|---|---|
| Distribution | Without meeting specific distribution | With meeting specific distribution |
| With number of samples | Small sample | Large sample |
| Meet the accuracy of the specified conditions | Slightly worse | Calibration |

Table 1 is a comparison table for characteristics of nonparametric statistics and parametric statistics. As can be seen from Table 1, the parent number statistics assume that the data conforms to a specific distribution, such as a normal distribution or a Poisson distribution. Nonparametric statistics does not use a specific distribution for statistics. Therefore, the use of the nonparametric statistics may have a wider range of use than the parametric statistics, for example, the detection method may be used to detect the optical characteristic data of the display panel, or the detection method may also be used to detect the appearance data of the display panel.

Further, when the numerical value of the inspection interval 20 and the numerical value of the comparison basis 10 are statistically identified, Levene detection algorithm in the nonparametric statistics is employed. The Levin detection algorithm, also known as the Levene test, is a kind of homogeneity test of variance. First, the data is represented by columns, r conditions are r columns, rows are records and then conversion data is obtained: for each column, each number of the column is subtracted from the mean of the column and the absolute value is taken, and the intra-group variance of the conversion data after processing in this way will become smaller. If the mean is subtracted and the absolute value is not taken, actually, one-way ANOVA is performed. Finally, one-way ANOVA is performed on the conversion data.

Optionally, a difference between an average trend offset of the numerical value of the comparison basis 10 and an average trend offset of the numerical value of the inspection interval 20 is less than or equal to a first threshold, and the average trend offset is the difference between the average trend of the measured value and a centerline. The average trend of the measured values may include, for example, an average, a median, and/or a mode. A difference between an average trend offset of the numerical value of the comparison basis 10 and an average trend offset of the numerical value of the inspection interval 20 is less than or equal to a first threshold, so that the average trend offset of the numerical value of the comparison basis 10 is very close to the average trend offset of the numerical value of the inspection interval 20. Illustratively, the average trend of the numerical value of the comparison basis 10 and the average trend of the numerical value of the inspection interval 20 are both close to the center line CL.

The detection method of the variance value may detect the average trend offset. If the average trend offset of the numerical value of the comparison basis 10 is large, it indicates that there may be a process problem, and the device requires to be checked to prevent it from happening. For the case where the average trend offset of the numerical value of the comparison basis 10 is very close to the average trend offset of the numerical value of the inspection interval 20, the detection method provided by the present disclosure may also realize the monitoring, control and improvement of each process of the display panel by detecting the degree of variation of the numerical value. The degree of variation refers to the degree of dispersion and the tendency to disperse of the numerical values, and may include, for example, the number of variations and/or the full range.

Optionally, the degree of variation of the numerical value of the comparison basis 10 is less than or equal to a second threshold. That is, the numerical value of the most comparison basis 10 is small in the degree of variation, and basically fluctuates within a range that is in a small distance from the center line CL. In FIG. 2, as shown, the degree of dispersion of the inspection interval 20 is greater than the degree of dispersion of the numerical value of the comparison basis 10, which fluctuates within a range that is in a relative large distance from the center line CL. A Levene detection algorithm may be used to check for the presence of a variance value.

Optionally, the first time interval and the second time interval do not overlap. At this time, the plurality of numerical values as the comparison basis 10 are not overlapped with the plurality of numerical values as the inspection interval 20, thereby enhancing the reliability of statistical identification.

Optionally, the first time interval is 28-31 days. Numerical values within one month (28-31 days) may selected to form a set, which is the comparison basis 10.

Optionally, the second time interval is at least 10 days. Since the variation trend is to be detected, the interval should not be too short, so numerical values of at least 10 days may be selected to form a set, which is the inspection interval 20.

Optionally, since many steps require the participation of the staff, and it is impossible to fully automate in the process of obtaining monitored data, and since it is generally not an automatic line and not each batch may be measured in terms of the optical characteristics of the liquid crystal display panel, it may be set such that the frequency of obtaining the numerical value of the inspection interval 20 is 1-10 days. It should be noted that, the present disclosure does not limit the first time interval, the second time interval, and the frequency of obtaining the numerical value of the inspection interval 20, which may be specifically determined according to actual needs.

Optionally, the values of the inspection interval 20 and the value of the comparison basis 10 for statistical identification are within the control limit, and the control limit is used to determine the significance of quality variation between samples and samples, batches and batches, and time and time. Values that exceed the control limit are easier to identify and may be handled by existing technical means. The detection method of variation value provided by the present disclosure mainly focuses on the detection of the variation of the value within the control limit. Statistical analysis of the collected data is performed to find the cause of the abnormality from the analysis, then corrective actions are taken, so that the process backs to normal, maintains stability, and the process capability is continuously improved.

In actual operation, in addition to the statistical differences in the above detection method, it is also necessary to satisfy the absolute difference, such as the machine error limit, thereby reducing the number of times an alarm is generated after finding the variation value using the detection method provided by the present disclosure.

Note that the above are only preferred embodiments of the present disclosure and the technical principles applied thereto. A person skilled in the art will understand that the present disclosure is not limited to the specific embodiments described herein, and that various ostensible changes, readjustments, mutual combinations, and substitutions can be made by those skilled in the art without departing from the scope of the present disclosure. Therefore, although the present disclosure has been described in detail by the above embodiments, the present disclosure is not limited to the above embodiments. Other equivalents may be included without departing from the spirit of the present disclosure, and the scope of the present disclosure is defined by the scope of the appended claims.

The invention claimed is:

1. A method for detecting a variation value, wherein the method comprises:
   selecting first values in a first time interval as a comparison basis;
   selecting second values in a second time interval as an inspection target; and
   detecting the variation value by employing a Levene detection algorithm in nonparametric statistics to the first values and the second values;
   wherein the operation of "employing a Levene detection algorithm in nonparametric statistics to the first values and the second values", comprises:
   representing the second values in columns to obtain conversion data;
   for the conversion data of each column, subtracting a value of the conversion data in each column from a mean value of the second values and obtaining an absolute value of subtraction for each column; and
   subjecting absolute values of all columns to one-way ANOVA;
   wherein a difference between an average trend offset of the first values and an average trend offset of the second values is less than or equal to a first threshold, and the average trend offset of the first values or the average trend offset of the second values is a difference between an average trend of a measured value and a centerline;
   determining that there is the variation value if a degree of dispersion of the inspection target is greater than a degree of dispersion of the comparison basis.

2. The method according to claim 1, wherein the method further comprises:
   counting a number of the variation value, and a degree of variation of the variation value.

3. The method according to claim 1, wherein the average trend of the measured value comprises: a mean, a median or a mode.

4. The method according to claim 1, wherein the average trend of the first values and the average trend of the second values are both close to the center line, and upper and lower control limits of product specification are symmetrical about the centerline.

5. The method according to claim 4, wherein the upper control limit and the lower control limit are calculated according to observation of brightness or chromaticity of a liquid crystal display panel.

6. The method according to claim 4, wherein:
   the upper control limit is calculated based on an average and a standard deviation, and the average and the standard deviation are calculated based on at least a part of historical data of brightness or chromaticity of a liquid crystal display panel.

7. The method according to claim 6, wherein the upper control limit is configured to be a sum of the average and four times of the standard deviation.

8. The method according to claim 1, wherein a degree of variation of the first values is less than or equal to a second threshold.

9. The method according to claim 8, wherein the degree of variation comprises: a degree of dispersion and a tendency to dispersion of the value.

10. The method according to claim 1, wherein the first time interval and the second time interval do not overlap.

11. The method according to claim 1, wherein the first time interval is 28-31 days.

12. The method according to claim 1, wherein the second time interval is at least 10 days.

13. The method according to claim 1, wherein a frequency of obtaining the second values is 1-10 days.

14. The method according to claim 1, wherein the first values and the second values are within an upper and lower control limits, and the upper and lower control limits are used to determine significance of quality variation between samples, batches, or time.

* * * * *